Feb. 6, 1962 C. A. TUDBURY 3,020,452
VIBRATION PROTECTIVE DEVICE
Filed Sept. 11, 1958

*INVENTOR.*
CHESTER A. TUDBURY
BY Alfred C. Body
ATTORNEY

3,020,452
VIBRATION PROTECTIVE DEVICE
Chester A. Tudbury, White Plains, N.Y., assignor to The Ohio Crankshaft Company, Cleveland, Ohio, a corporation of Ohio
Filed Sept. 11, 1958, Ser. No. 760,427
5 Claims. (Cl. 317—165)

This invention pertains to the art of vibration protective devices and more particularly to a device adapted to de-energize electrical circuits or actuate a warning signal when vibration exceeds a predetermined amount.

The invention is particularly applicable to the protection of electric motor generators against excessive vibration and will be described with particular reference thereto, although it will be appreciated that the invention has broader applications.

In the art of electric motors, electric generators or electric motor generators, it has always been a problem to stop the device whenever vibration within the device due to various causes reaches an amount sufficient to damage the bearings or cause rubbing between the rotating parts.

Various arrangements have been proposed in the past, all of which were either very expensive, unduly complicated or unreliable in operation. Another problem with such vibration protective devices has been when the motors or generators must be occasionally started or stopped. Oftentimes during the starting or stopping, they will go through a resonent period wherein the vibration exceeds that for which the protective device is set with the result that the apparatus is activated, requiring it to then be reset before operation of the motor or generator can be continued.

The present invention contemplates new and improved apparatus which overcomes all of the above-referred to difficulties and others and provides a vibration protective device which is simple in construction, effective in operation and which can be de-activated during starting and stopping periods of the motor.

In accordance with the present invention, the vibration protective device is comprised of an upwardly biased operating arm supporting a member of sufficient mass to oppose the upward bias, the member and arm having co-acting surfaces so arranged that vibration of a predetermined amount will displace the member from the arm.

Further in accordance with the invention, magnetically operated means are provided for preventing displacement of the member from the arm during predetermined periods such as the starting or stopping of the motor. In a more limited aspect, the arm and member are each comprised of magnetically permeable material and an electrically energized coil is associated with the arm to magnetize same and hold the member in engagement with the arm during periods of vibration when it is desired that the device not be actuated.

The principal object of the invention is the provision of a new and improved vibration protective device which is simple in construction, positive in operation and inexpensive to build.

Another object of the invention is the provision of a new and improved vibration protective device which includes an upwardly biased arm supporting a member of a mass sufficient to oppise the bias, the member being displaceable from the arm under predetermined amounts of vibration.

Another object of the invention is the provision of a new and improved arrangement for preventing displacement of the member from the arm during predetermined periods.

Another object of the invention is the provision of a new and improved means for preventing displacement of the mass from the arm which is simple in construction and positive in operation.

The invention may take physical form in certain parts and arrangements of parts, a preferred embodiment of which will be described in detail in this specification and illustrated in the accompanying drawing which is a part hereof and wherein.

Figure 1:
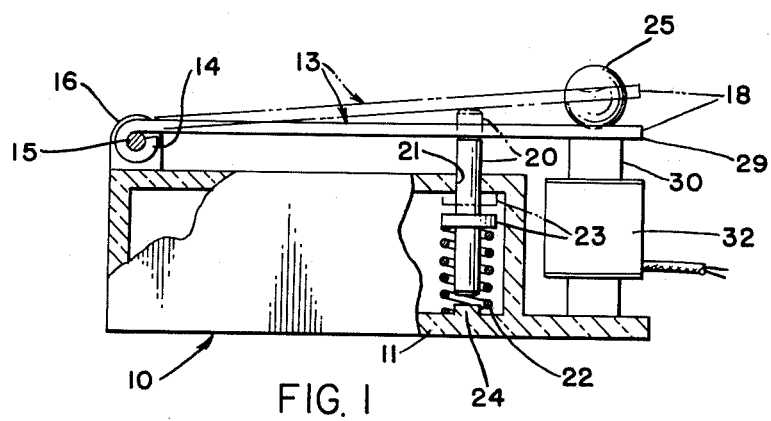
FIGURE 1 is a side elevational view partly in section of a vibration protective device illustrating a preferred embodiment of the invention.
Figure 2:
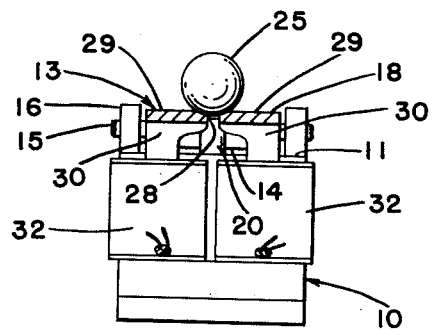
FIGURE 2 is an end elevational view thereof.
Figure 3:
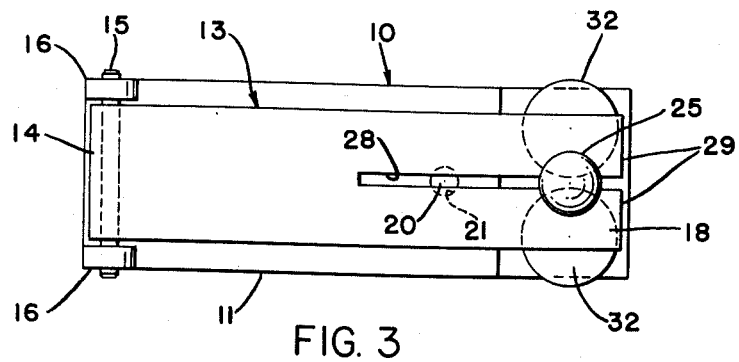
FIGURE 3 is a top elevational view thereof.

Referring now to the drawings wherein the showings are for the purposes of illustrating preferred embodiments of the invention only and not for the purposes of limiting same, FIGURE 1 shows what may be termed a conventional switch 10 including an outer housing 11 enclosing conventional electrical contacts not shown. The switch includes an operating arm 13 mounted for vertical movement. While this vertical movement may be obtained in any one of a number of different ways, in the embodiment shown, the left hand end of the arm 13 has an eyelet 14 formed thereon through which a pivot pin 15 extends, the pivot pin in turn being mounted in upstanding ears 16, one on either side of the housing 11. Thus the right hand end 18 of the arm 13 is vertically movable.

This right hand end 18 in accordance with the invention, is biased upwardly in any suitable manner, although in the embodiment of the invention, a pin 20 is reciprocally mounted in an opening 21 in the top of the housing 11 and engages the underside of the arm 13 spaced from the pin 15. A helical compression spring 22 surrounds the lower end of the pin 20 and engages a flange 23 thereon to bias the pin 20 upwardly. The flange 23 also serves as a stop against the upward movement of the pin 20 by engaging the under side of the top 20 of the housing 11. A boss 24 serves to center the lower end of the spring 22 relative to the pin 20.

The switch 10 is operated by upward and downward movement of the end 18 of the arm 13. This may be accomplished by having the pin 20 operatively associated with the switching mechanism or by means of other mechanism operatively associated with the arm 13.

The arm 13 has a first position shown by the dotted lines of FIGURE 1 where the switch may be either open or closed as the case may be, and a second position shown by the full lines of FIGURE 1 where the switch is in the opposite condition and as will be seen, spring 22 biases the arm 18 from the first to the second position.

Means are provided for holding the arm in the first position, such means comprising a member 25 resting on the upper surface of the arm 13 and having a weight such that when considered in relation to the leverage arms, a downward force greater than the upward bias of the spring 22 is created. Thus depending upon the location of the member 25 along the arm 13, the weight of the member 25 may have to be varied so that the downward force created, will always be greater than the upward bias of the spring 22.

The member 25 is so arranged on the upper surface of the arm 13 that it will be displaced therefrom when vibration of the mechanism in a horizontal direction exceeds a predetermined amplitude or frequency or both. Thus the member 25 in accordance with the invention, has a limited area of engagement with the upper surface of the arm 13 and also has a center of gravity above the engaging surfaces.

In the embodiment of the invention shown, a member 25 is in the shape of a steel ball and the upper surface of the arm 13 adjacent the end 18 has a slight depression formed therein in which the member 25 rests. The sensitivity of the device may be adjusted by controlling the depth of this depression.

The device may thus be made very sensitive or insensitive as desired.

Many electric motors and/or generators often pass through resonant rotational speeds as the motor and/or generator approaches the operating speed or slows down from the operating speed, such vibration many times being sufficient to displace the member 25. In accordance with the present invention, magnetic means are provided for positively retaining the member 25 on the upper surface of the arm 13 during such periods. While such means may include a magnetically operated arm which engages the upper surface of the member 25, in the preferred embodiment, the member 25 and at least the portion of the arm 13 which supports the member 25, are made of magnetically permeable material and an electro coil is provided for creating a magnetic field such that the member 25 will be magnetically attracted to the arm 13. In the embodiment of the invention shown, the arm 13 has a longitudinally extending slot 28 extending to the left from the end 18 to form a pair of parallel extending legs 29 with the member 25 resting symmetrically on the upper surface thereof and bridging the gap 28.

An electro magnet comprised of a U-shaped magnetic core having a pair of parallel legs 30 each engaging the underside of one of the legs 29 and with each leg energized by means of a coil 32, is provided. Thus when the coils 32 are electrically energized, the magnetic flux flows upwardly through the leg 30 to the leg 29 thence through the member 25 and thence returned to the other leg 30. The member 25 will be held to the upper surface of the arm 13 depending upon the strength of the magnetic flux.

Obviously if desired, the coil 32 could be placed around one or both of the legs 29. The arrangement shown is preferred, however, because the weight of the coil 32 does not act in opposition to the bias of the spring 22.

The coil 32 may be energized in any desired manner from the starting and stopping circuit for the electric motor and/or generator.

It will thus be seen that a vibration protective device has been described which accomplishes all of the objectives heretofore set forth and others and provides such a device which is sensitive and yet which will not be set off by vibration during the time that the motor or generator is being started or stopped.

Obviously, various means can be provided for resetting the device after the member 25 has been displaced from the upper surface of the arm 13. Such arrangements form no part of the present invention.

Obviously, modifications and alterations will occur to others upon a reading and understanding of this specification and it is my intention to include such modifications and alterations insofar as they come within the scope of the appended claims.

Having thus described my invention, I claim:

1. A vibration responsive device comprising in combination a vertically movable arm having at least a portion thereof comprised of a pair of slightly spaced legs, a depression in the upper surface of said legs, a magnetically permeable member separate from said arm and resting in said depression, and electrically energized magnet means for magnetizing said legs to hold said magnetically permeable member thereon by magnetic attraction.

2. A vibration responsive device comprising in combination a vertically movable member having at least in part two slightly spaced magnetically permeable portions forming at least a part of the upper surface thereof, a depression in said portions bridging said space, a magnetically permeable member separate from said vertically movable member and resting in said depression, and electrically energized magnet means for magnetizing said magnetically permeable portions to hold said magnetically permeable member thereon by magnetic attraction.

3. A vibration responsive device comprising in combination; a vertically movable arm having an upper surface, means biasing said arm upwardly with a predetermined force, said surface having a depression therein, a magnetically permeable member resting in said depression and having a weight to exert a downward force greater than said upward predetermined force, said member being displaceable out of said depression in response to a predetermined vibrational force, and controllable magnetic means for retaining said member on said arm at predetermined times.

4. A device for protecting rotating electrical machinery from excessive vibrations comprising a vertically movable arm adapted for connection to said machinery and having at least a portion thereof comprised of a pair of slightly spaced legs, a depression in the upper surface of said legs, a magnetically permeable member separable from said arm and resting in said depression, and electrically energized magnet means for magnetizing said legs to hold said magnetically permeable member thereon by magnetic attraction.

5. A device for protecting rotating electrical machinery from excessive vibrations comprising a flat lever arm having its one end adapted for connection to the machinery to be protected about a horizontally-extending pivotal axis, the other end of said lever arm being bifurcated to provide a pair of slightly spaced legs, a depression in the upper surface of said legs, a magnetically permeable member separable from said arm and resting in said depression, spring means urging said one end of the lever arm upwardly whereby the arm will pivot upwardly about said axis when the magnetically permeable member is displaced from said depression by vibrational forces, and an electromagnet actuable during starting or stopping of the electrical machinery for magnetizing said legs to hold the magnetically permeable member in said depression by magnetic attraction to thereby prevent the member from being displaced out of the depression by ordinary vibrational forces occurring during starting and stopping periods of the electrical machinery.

References Cited in the file of this patent

UNITED STATES PATENTS

| | | |
|---|---|---|
| 1,650,968 | Tedeschi | Nov. 29, 1927 |
| 2,509,667 | Ballinger | May 30, 1950 |
| 2,806,916 | Gibble | Sept. 17, 1957 |
| 2,843,076 | Cook et al. | July 15, 1958 |